Sept. 6, 1949.    A. I. MOUNT ET AL    2,481,032
AUTOMATIC ADJUSTABLE PITCH PROPELLER
Filed Oct. 27, 1945    2 Sheets-Sheet 1

INVENTORS.
ALVA I. MOUNT.
KENNETH A. RAYPHOLTZ.
BY
Lockwood, Goldsmith & Galt,
ATTORNEYS.

Sept. 6, 1949.   A. I. MOUNT ET AL   2,481,032
AUTOMATIC ADJUSTABLE PITCH PROPELLER
Filed Oct. 27, 1945   2 Sheets-Sheet 2
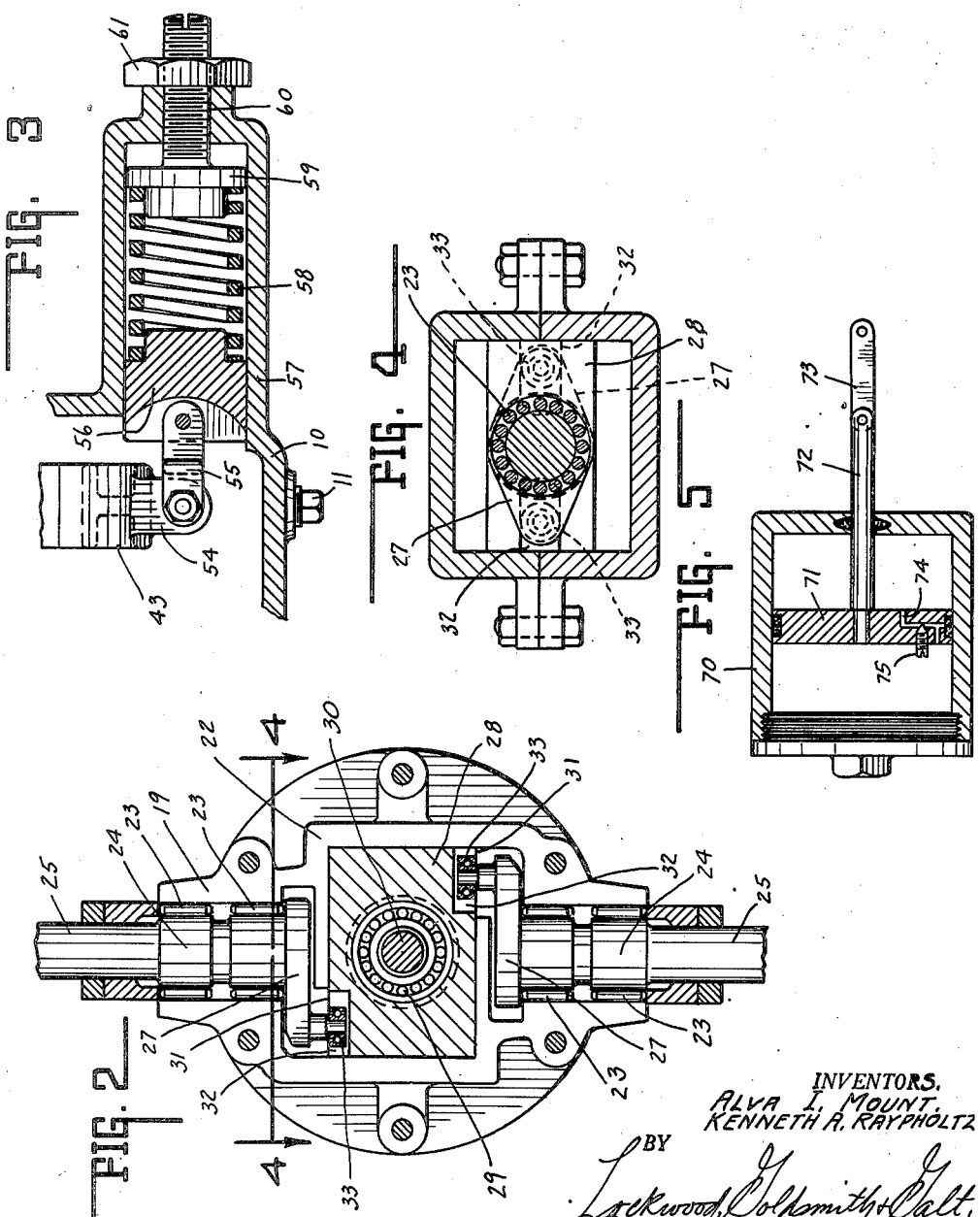
INVENTORS.
ALVA I. MOUNT.
KENNETH A. RAYPHOLTZ
BY
Lockwood, Goldsmith & Galt,
ATTORNEYS.

Patented Sept. 6, 1949

2,481,032

UNITED STATES PATENT OFFICE 2,481,032

AUTOMATIC ADJUSTABLE PITCH PROPELLER

Alva I. Mount and Kenneth A. Raypholtz, Marion, Ind.

Application October 27, 1945, Serial No. 624,984

9 Claims. (Cl. 170—160.13)

This invention relates to a variable pitch propeller structure for aircraft or boats and the like.

The chief object of this invention is to provide a comparatively simple, inexpensive, automatic control for changing the pitch of the blades of a propeller for aircraft and proportional to the torque available.

Heretofore, in aircraft of comparatively small horsepower, it has been customary, due to cost, etc., to use a fixed pitch multi-bladed propeller, the blades being set or having a pitch which is primarily arranged for takeoff or cruising but not the best pitch for either. Hence, performance is sacrified.

Again, if a variable pitch control of manual type be provided, same obviously is dependent upon pilot actuation, the pilot having plenty to do (in the case of aircraft) in landing and taking off without having to worry with this control.

The present invention, accordingly, is directed to an automatic control and is further characterized by the fact that at any time any cylinder cuts out the blade pitch is immediately changed to the power then available so that the engine (of any desired type) is not unduly overloaded.

The present invention is further characterized by the substantially instantaneous variation of blade pitch in accordance with throttle adjustment so that maximum efficiency is maintained at all times.

The present invention is still further characterized by failing upon the side of safety, that is, if the torque compensating load spring breaks the pitch immediately is of low pitch, while if the spring sticks the pitch immediately is of high pitch.

Since the control is automatic, the screw effect in the landing of aircraft provides the plane with its maximum gliding range.

Again, in over-shooting in attempting to land an aircraft, the blade pitch is automatically changed for maximum efficiency as the pilot opens the throttle to again rise for a subsequent landing attempt.

This invention also has the advantage that in rough weather the pitch is changed as required since engine overspeeding occurs when the craft rises and vice versa, and in like manner serves as an engine shock absorber.

Furthermore, this invention helps to reduce the tendency of the pilot stalling the aircraft at take-off.

This invention also eliminates excessive engine R. P. M. or over-speeding of engine at take-off normally experienced with a fixed pitched propeller.

This invention has as its chief feature a calibrated load spring opposing torque applied to a yoke, movement of the yoke being utilized for pitch control purposes.

Other objects and features of the invention will be set forth more fully hereinafter.

The full nature of the invention will be understood from the accompanying drawings and the following description and claims:

In the drawings Fig. 1 is a central sectional view of the propeller end of an aircraft power system, by way of example only.

Fig. 2 is a sectional view of the propeller blade structure and is taken on line 2—2 of Fig. 1 and in the direction of the arrows.

Fig. 3 is a transverse sectional view taken on line 3—3 of Fig. 1 and in the direction of the arrows.

Fig. 4 is a sectional view taken on line 4—4 of Fig. 2 and in the direction of the arrows.

Fig. 5 is a longitudinal sectional view of a dashpot or dampering yoke hunting prevention device.

Figure 1:
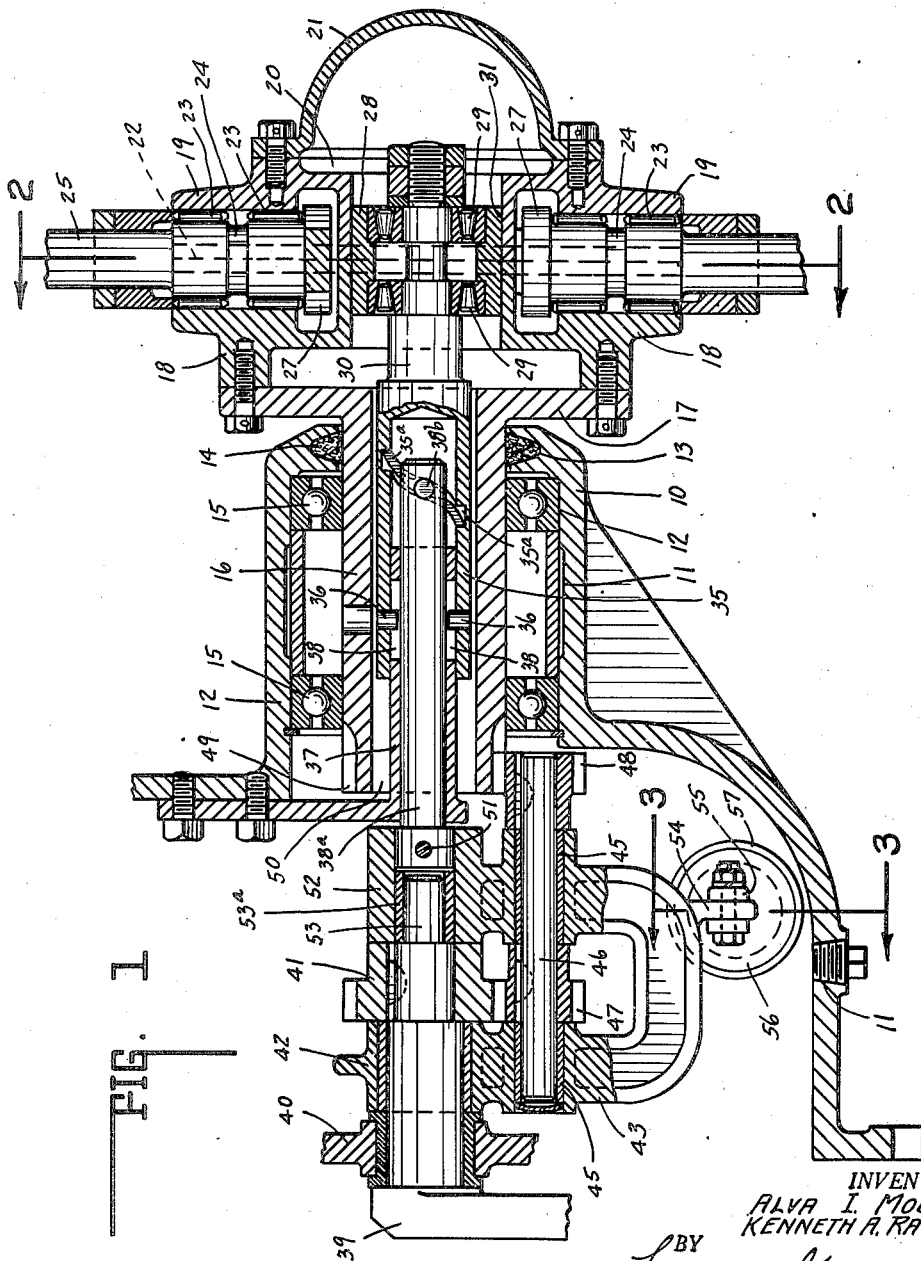

In Fig. 1 of the drawings 10 indicates an end casting having drain structure 11 and providing bearing ways 12 and terminating in seal seat 13 mounting seal 14. In ways 12 are the races 15 which mount the tubular shaft 16 that beyond seal 14 terminates in flange 17 to which the propeller hub 18 is secured.

Propeller hub 18 has a suitable number of blade receiving sockets 19 and the open forward end 20 has secured to it nose cap 21. The hub may be parted as shown at 22. In each socket 19 are mounted spaced anti-friction bearings 23 carried by wells in the socket. Another type of connection comprises spaced bearings retained on blade stub 24 by snap rings. Thus, the blade 25 is rotatively mounted in the supporting and retaining socket and rotates when the hub rotates with shaft 16.

Each blade stub 24 terminates in a crank arm 27 whereby the blade may be rotated for pitch change upon its longitudinal axis. A block 28, see Fig. 1, is rotatively supported by bearings 29 on spindle 30 at the hub enclosed end thereof. The block 28 has adjacent each socket 19 a flat face 31 in which is formed an elongated cam groove 32 that is transverse to the longitudinal axis of the spindle.

Each crank 27 terminates in a roller follower 33 riding in the adjacent cam groove 32. This roller may be anti-friction mounted as shown.

Thus as the spindle is moved longitudinally the cam grooves move forward or backward axially of the propeller axis and in so doing rock the crank arms 27 on the propeller blades to vary blade pitch correspondingly.

The spindle 30 near the flange 17 of shaft 16 is slidable. The inner opposite end 35 is cylindrical and mounts transverse pins 36. A cylindrical bearing 37, rigid with casing 10 slidably supports tubular shaft 35 near its inner end and has pin slots 38 to insure sliding only of spindle 30. Rotatable in bearing 37 is shaft 38a which terminates within spindle 35—30 and has pin 38b seated in spiral slots 35a.

Thus rotation of shaft 16 is entirely independent of spindle 30 and its movement. However, oscillatory movement of shaft 38a causes the spindle 30 to move forward or rearward and hence causes corresponding movement of the block 28 to effect blade pitch variation and blade positioning in accordance with the amount of rotation of shaft 38a.

The engine crankshaft 39 or other suitable power shaft, engine driven, is supported in bearing 40 and projects forwardly thereof and mounts gear 41. Rotatively supported upon said shaft 39 is one end 42 of a U-type yoke 43 which in bearings 45 supports jack shaft 46 carrying gear 47 in constant mesh with gear 41 and a gear 48 meshing with gear 49 carried by the inner end of gear shaft 16.

This gear train may have any proportion desired, that is, shaft 16 may rotate at the same speed as, slower than, or faster than shaft 39. Gear 49 is tubular as at 50 and through the same in axial alignment with shaft 39 extends shaft 38a pinned at 51 to said yoke 43 at the other end 52 thereof. Pilot 53 on shaft 39 projects into socket 53a in the end 52 of the yoke end and thus the yoke is rotatively supported at its forward end by shaft 39.

From the foregoing, therefore, axial alignment is constantly maintained and transverse whip is prevented. This mid-portion of yoke 43 terminates in an eye structure 54 connected by linkage 55 to head 56 slidable in cylindrical casing 57 formed in or rigid with housing 10 as desired.

Head 56 is elongated, as shown, to prevent cocking or binding in the bore and its inner end seats one end of calibrated load spring 58 enclosed in said bore. The opposite end of the spring is located by an adjustable abutment 59, adjustably mounted at 60 and locked in adjusted position by exposed nut 61.

When power is applied to the hub, and resistance is provided by the propeller blades, the rotational thrust or torque tends to rotate yoke 43 counter-clockwise which is, of course, opposed by load spring 57 and the counter thrust, torque, or load on the blades.

When the balance of these forces is disturbed, the yoke is correspondingly oscillated either clockwise by the spring or counter-clockwise by the torque, so that yoke movement effects spindle advance or retraction and blade pitch change until equilibrium is reestablished.

The foregoing is all automatic and without any attention from the pilot, wherefore the control insures maximum efficiency at all times, whether gliding, landing, cruising, taking off, or throttle change is effected or if a cylinder cuts out.

In addition, whenever desired, a dampening unit may be applied to reduce hunting or surging and, by way of example only, same may comprise a cylinder 70 carried by housing 10 and enclosing piston 71 carried by rod 72 link connected as at 73 to eye 54 of the yoke 43. Through the piston is passage 74 controlled by needle valve 75. Thus the liquid in the cylinder 70 restrictively passes through the piston from one side to the other and thus slows down yoke swing, thereby preventing hunting or surging of the automatic control.

It is also to be understood that the yoke could control valves, electrical circuits, warning devices, safety devices, power releases for unloading and any of these intermediate controlled devices might act upon such mechanism to control not only the propeller pitch, but other mechanical units.

It is also obvious that the yoke could be connected to an indicator in the cockpit, either directly or remotely and indicate to the pilot the pitch setting.

While the invention has been illustrated and described in great detail in the drawings and foregoing description, the same is to be considered as illustrative and not restrictive in character.

The several modifications described herein, as well as others which will readily suggest themselves to persons skilled in this art, all are considered to be within the broad scope of the invention, reference being had to the appended claims.

The invention claimed is:

1. An automatic blade pitch varying propeller structure including in combination a tubular power shaft, a propeller hub mounted on one end thereof for rotation thereby, propeller blades radially projecting from and revolvable with the hub and rotatable upon their respective radial axes, means for simultaneously rotating the blades upon their axes for pitch variation including means aligned with the shaft, means within the shaft for shifting the aligned means longitudinally of the shaft for blade pitch adjustment, power means for rotating the other end of said power shaft, and a torque responsive device juxtapositioned to the last mentioned shaft end and connected to the shaft enclosed means for automatically shifting the latter in an amount proportional to the torque available.

2. A structure as defined by claim 1 wherein the juxtapositioned device includes a pivotally mounted yoke, calibrated force means normally constraining the yoke to predetermined position and cam means coaxial with the shaft for shifting the shaft aligned means and translating yoke rotation to reciprocation of the latter.

3. A structure as defined by claim 1 wherein the juxtapositioned device includes a pivotally mounted yoke, calibrated force means normally constraining the yoke to predetermined position and cam means coaxial with the shaft for shifting the shaft aligned means and translating yoke rotation to reciprocation of the latter, said shaft aligned means including a cam and crank connection to each blade.

4. In a variable pitch bladed propeller structure the combination of a rotatably mounted yoke, power means carried thereby, a propeller shaft coaxial with the yoke pivot axis and rotatable by the power means, calibrated force means normally constraining the yoke to a predetermined position and opposing yoke rotative movement therefrom incident to torque application thereto, and propeller blade pitch varying mechanism coaxial with the shaft and movable proportional to yoke rotation from the predetermined position for propeller blade pitch variation.

5. A variable pitch bladed propeller structure as defined by claim 4 wherein yoke oscillation dampening means is provided and operatively connected to the yoke for surging and hunting elimination.

6. A variable pitch bladed propeller structure as defined by claim 4 wherein a power shaft rotatably supports one end of the yoke, and the mechanism is rotatably supported by the propeller shaft, and a pilot bearing is provided between the yoke other end and power shaft.

7. A variable pitch bladed propeller structure as defined by claim 4 wherein a power shaft rotatably supports one end of the yoke, and the mechanism is rotatably supported by the propeller shaft, and a pilot bearing is provided between the yoke other end and power shaft, and yoke oscillation dampening means is provided and operatively connected to the yoke for surging and hunting elimination.

8. A variable torque drive including in combination a pair of coaxial shafts, a yoke swivelled coaxial therewith, a gear train between the shafts and partially carried by said yoke and movable therewith, calibrated force means opposing yoke movement, adjustable driven means carried by one of said shafts, and means coaxial with the last mentioned shaft for adjusting the driven means and in accordance with yoke movement.

9. A drive as defined by claim 8 wherein dampening means is operatively associated with the yoke for yoke surge or hunting prevention.

ALVA I. MOUNT.
KENNETH A. RAYPHOLTZ.

REFERENCES CITED

The following references are of record in the file of this patent:

UNITED STATES PATENTS

| Number | Name | Date |
|---|---|---|
| 612,511 | Beck | Oct. 18, 1898 |
| 1,008,953 | Clennell et al. | Nov. 14, 1911 |
| 1,650,776 | Stock | Nov. 29, 1927 |
| 1,929,436 | McCollough | Oct. 10, 1933 |
| 2,139,982 | Smith | Dec. 13, 1938 |
| 2,179,492 | Caldwell et al. | Nov. 14, 1939 |
| 2,404,743 | Prause | July 23, 1946 |

FOREIGN PATENTS

| Number | Country | Date |
|---|---|---|
| 8,431 | Great Britain | Apr. 7, 1909 |